(12) United States Patent
Friend

(10) Patent No.: US 10,399,325 B2
(45) Date of Patent: Sep. 3, 2019

(54) SYSTEMS AND METHODS FOR PREPARING A WORKSITE FOR ADDITIVE CONSTRUCTION

(71) Applicant: Caterpillar Inc., Peoria, IL (US)

(72) Inventor: Paul Friend, Morton, IL (US)

(73) Assignee: Caterpillar Inc., Deerfield, IL (US)

( * ) Notice: Subject to any disclaimer, the term of this patent is extended or adjusted under 35 U.S.C. 154(b) by 240 days.

(21) Appl. No.: 15/376,939

(22) Filed: Dec. 13, 2016

(65) Prior Publication Data

US 2018/0162011 A1 Jun. 14, 2018

(51) Int. Cl.
| | |
|---|---|
| B29C 64/10 | (2017.01) |
| B33Y 40/00 | (2015.01) |
| E02F 9/26 | (2006.01) |
| E02F 9/20 | (2006.01) |

(52) U.S. Cl.
CPC .............. *B33Y 40/00* (2014.12); *E02F 9/261* (2013.01); *E02F 9/205* (2013.01); *E02F 9/2054* (2013.01)

(58) Field of Classification Search
CPC ......... B33Y 50/02; B33Y 40/00; B33Y 50/00; G05B 13/021; G05B 19/402; G05B 2219/42217; G05B 2219/49019; G05B 2219/49068; G05D 1/00; B29C 64/10
See application file for complete search history.

(56) References Cited

U.S. PATENT DOCUMENTS

| | | | |
|---|---|---|---|
| 7,865,285 B2 | 1/2011 | Price et al. | |
| 8,644,964 B2 | 2/2014 | Hendron et al. | |
| 8,718,837 B2 | 5/2014 | Wang et al. | |
| 9,102,055 B1 | 8/2015 | Konolige et al. | |
| 2008/0294309 A1* | 11/2008 | Kaprielian | A01B 69/008 701/27 |
| 2014/0118583 A1 | 5/2014 | Shida et al. | |
| 2015/0240452 A1* | 8/2015 | Faivre | E02F 9/2079 701/50 |
| 2015/0240453 A1* | 8/2015 | Jaliwala | E02F 9/2041 701/50 |
| 2016/0107396 A1 | 4/2016 | Berman | |
| 2016/0222630 A1 | 8/2016 | Friend | |

FOREIGN PATENT DOCUMENTS

CN 104416572 A 3/2015

* cited by examiner

*Primary Examiner* — Jacob T Minskey
*Assistant Examiner* — Cedrick S Williams
(74) *Attorney, Agent, or Firm* — Miller, Matthias & Hull

(57) ABSTRACT

A system for preparing a worksite for an additive construction operation includes a positioning system configured to determine positioning signals including topographical characteristics of the worksite. An additive construction plan includes, at least, structure placement data, configured for a desired location for constructing the structure, and toolpath instructions for guiding the implement to construct the structure. A controller is configured to determine a construction zone on the worksite based on the structure placement data and the topographical characteristics of the worksite. The controller is further configured for determining if the construction zone is readied for execution of the toolpath instructions at the construction zone and, if the construction zone is not readied for such execution, identifying one or more impediments to construction at the worksite, within the construction zone, based on the topographical characteristics of the worksite.

20 Claims, 10 Drawing Sheets

SYSTEMS AND METHODS FOR PREPARING A WORKSITE FOR ADDITIVE CONSTRUCTION

TECHNICAL FIELD

The present disclosure generally relates to additive construction systems and methods and, more particularly, to systems and methods for preparing a worksite for additive construction operations.

BACKGROUND

Additive construction may be implemented on worksites to create a structure based on a computer-implemented additive construction plan, which may be used to control a machine and/or an associated implement, to construct said structure. In some examples, utilizing work machines such as, but not limited to, excavators, tele-handlers, and gantry machines, such work machines may be used to control additive construction implements, in order to perform additive construction.

For controlling additive construction implements and their associated machines, various control systems are utilized to manually, autonomously, or semi-autonomously control movement of the machine and work implement in the X, Y, and Z directions, based, at least in part, on additive construction planning. For example, control systems for machines and implements can control orientation of the additive construction implement, such as, but not limited to, a roll, a pitch, and/or a yaw of the implement. Such control systems may utilize a controller to receive instructions from various sources (e.g., user controls, a memory, a remote control, etc.) and determine controls to execute via the control system. The control systems send signals to elements associated with the controller, such as motors or actuators, to position the additive construction implement in accordance with the determined controls.

In some control systems, a structure of the machine may be utilized by and actuated by the control system to control the position of the additive construction implement. These systems may use one or more actuators to control movement of the machine and/or implement while positioning the additive construction implement. However, control via such machine-associated components may not provide the desired control accuracy for additive construction implements and/or such components may not be configured or configurable for use in accordance with additive construction planning.

Some modern implement control systems, such as the control systems disclosed by U.S. Pat. No. 8,644,964 ("Method and System for Controlling Movement of an End Effector on a Machine"), may employ control schemes that transmit signals movement of a machine to moving elements of the control system (e.g., control of a crane of an excavator) and transmit signals for movement of the machine to other elements of the control system that are more directly associated with the implement, in accordance with an implement control plan. However, such systems and methods do not adequately evaluate worksite conditions, prior to commencing with actual construction of structures.

Accordingly, such prior known control systems and methods may not provide for suitable worksite planning features for ensuring safe and effective construction of structures, via additive construction. Therefore, systems and methods for improving preparation of a worksite, for additive construction operations, are desired.

SUMMARY

In accordance with one aspect of the disclosure, a system for preparing a worksite for an additive construction operation, the additive construction operation performed by an implement associated with a machine, is disclosed. The system may include a positioning system, a memory, and a controller. The positioning system may include one or more perception sensors and be configured to determine positioning signals, the positioning signals including topographical characteristics of the worksite. The memory may be configured to store, at least, an additive construction plan, and the additive construction plan for use in planning additive construction and controlling the additive construction implement during construction of a structure. The additive construction plan may include, at least, structure placement data, configured for a desired location for constructing the structure, and toolpath instructions for guiding the implement to construct the structure. The controller may include a processor and be configured to receive, at least, the topographical characteristics of the positioning signals, from the positioning system, access the additive construction plan, from the memory, and determine a construction zone on the worksite based on the structure placement data and the topographical characteristics of the worksite. The controller may further be configured for determining if the construction zone is readied for execution of the toolpath instructions at the construction zone and, if the construction zone is not readied for such execution, identifying one or more impediments to construction at the worksite, within the construction zone, based on the topographical characteristics of the worksite.

In accordance with another aspect of the disclosure, a system for performing additive construction operations on a worksite is disclosed. The additive construction operations associated with an additive construction plan for constructing a structure. The additive construction plan for controlling the additive construction implement during construction of the structure and including, at least, structure placement data, configured for a desired location for constructing the structure, and toolpath instructions for guiding the implement to construct the structure. The system may include an implement, a machine, a positioning system, and a controller. The implement may be configured to additively construct the structure in accordance with the additive construction plan. The machine may be operatively associated with the implement and include one or more control actuators operatively associated with the implement, each of the one or more actuators configured to position the implement, with respect to the machine. The machine may further include a power source providing power to at least one of the one or more control actuators to perform functions of the machine. The positioning system may include one or more perception sensors and be configured to determine positioning signals, the positioning signals including topographical characteristics of the worksite. The controller may include a processor and be configured to receive, at least, the topographical characteristics of the positioning signals, from the positioning system, access the additive construction plan, and determine a construction zone on the worksite based on the structure placement data and the topographical characteristics of the worksite. The controller may further be configured for determining if the construction zone is readied for execution of the toolpath instructions at the construction zone and, if the construction zone is not readied for such execution, identifying one or more impediments to construction at the worksite, within the construction zone, based on the topographical characteristics of the worksite. The controller may further be configured to instruct the one or more control actuators of the machine to position the implement for performing the additive construction operations, in accordance with the toolpath instructions, if the construction zone is readied for execution of the toolpath instructions at the construction zone.

In accordance with yet another aspect of the disclosure, a method for preparing a worksite for an additive construction operation is disclosed. The additive construction operation may be performed by an implement associated with a machine. The method may include determining positioning signals, using a positioning system including one or more perception sensors, the positioning signals including, at least, topographical characteristics of the worksite. The method may further include accessing, by a controller, an additive construction plan, the additive construction plan and for use in planning additive construction and controlling the additive construction implement during construction of a structure, the additive construction plan including, at least, structure placement data, configured for a desired location for constructing the structure, and toolpath instructions for guiding the implement to construct the structure. The method may further include receiving, by the controller, the topographical characteristics of the positioning signals, from the positioning system. The method may further include determining a construction zone on the worksite based on the structure placement data and the topographical characteristics of the worksite. The method may further include determining if the construction zone is readied for execution of the toolpath instructions at the construction zone. The method may further include identifying one or more impediments to construction at the worksite, within the construction zone, based on the topographical characteristics of the worksite, if the construction zone is not readied for execution of the toolpath instructions at the construction zone.

These and other aspects and features of the present disclosure will be better understood when read in conjunction with the accompanying drawings.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

DETAILED DESCRIPTION

Figure 1:
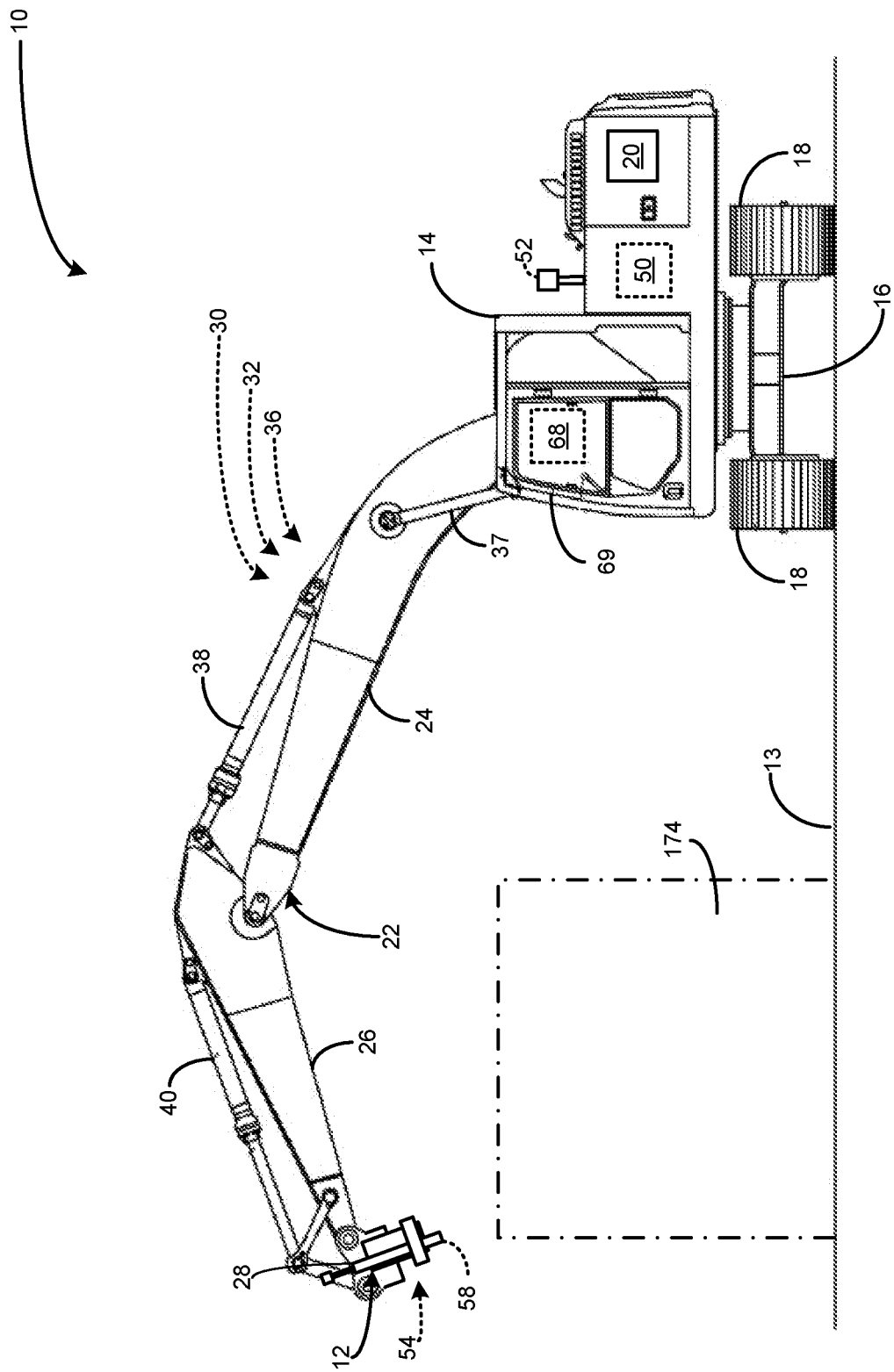
FIG. 1 is a side view of an example implement, an associated machine, and an associated control system, the control system configured for preparing a worksite for additive construction operations, according to an embodiment of the present disclosure.

Turning now to the drawings and with specific reference to FIG. 1, a machine 10 having an implement 12 is illustrated in accordance with the teachings of the present disclosure. While the machine 10 in FIG. 1 is depicted, generally, as an excavator, the teachings of the present disclosure may relate to other work machines that employ control systems for an implement associated with said machine 10. The term "machine" as used herein may refer to any machine that performs some type of operation associated with an industry such as mining, construction, farming, transportation, or any other industry known in the art. For example, the machine 10 may be an earth-moving machine, a wheel loader, an excavator, a gantry machine and/or system, a dump truck, a backhoe, a material handler, or the like. Moreover, the implement 12 connected to the machine 10 may be an additive construction implement utilized for performing, large-scale three-dimensional printing, additive manufacturing, and any similar tasks known in the art.

As depicted in FIG. 1, the machine 10 may include a housing 14 disposed on top of and supported by an undercarriage 16. The undercarriage 16 may be associated with one or more ground engaging devices 18, which may be used for mobility and propulsion of the machine 10. The ground engaging devices 18 are shown as a pair of continuous tracks; however, the ground engaging devices 18 are not limited to being continuous tracks and may additionally or alternatively include other ground engaging devices such as rotatable wheels. A power system 20 is may provide power to the propel or otherwise move the ground engaging devices 18 and may include one or more power sources, such as internal combustion engines, electric motors, fuel cells, batteries, ultra-capacitors, electric generators, and/or any power source which would be known by a person having ordinary skill in the art. Such a power system 20 may further be used to power various motion of the implement 12 or any other elements and control systems associated with the machine 10 and/or implement 12.

For control of the implement 12, the machine may further include a crane 22, which may include a boom 24 operatively coupled with a stick 26. The implement 12 may be attached to the crane 22 at, for example, a distal end 28 of the stick 26. For positioning the implement 12, the crane 22 and, as associated elements, the boom 24 and stick 26, may be controlled by a control system 30. The control system 30 is shown in a schematic depiction in FIG. 2 and may be utilized for a variety of tasks associated with additive construction, such as preparing the worksite 13 for an additive construction operation. Further, the control system 30 may be utilized to perform additive construction operations on the worksite 13.

Figure 2:
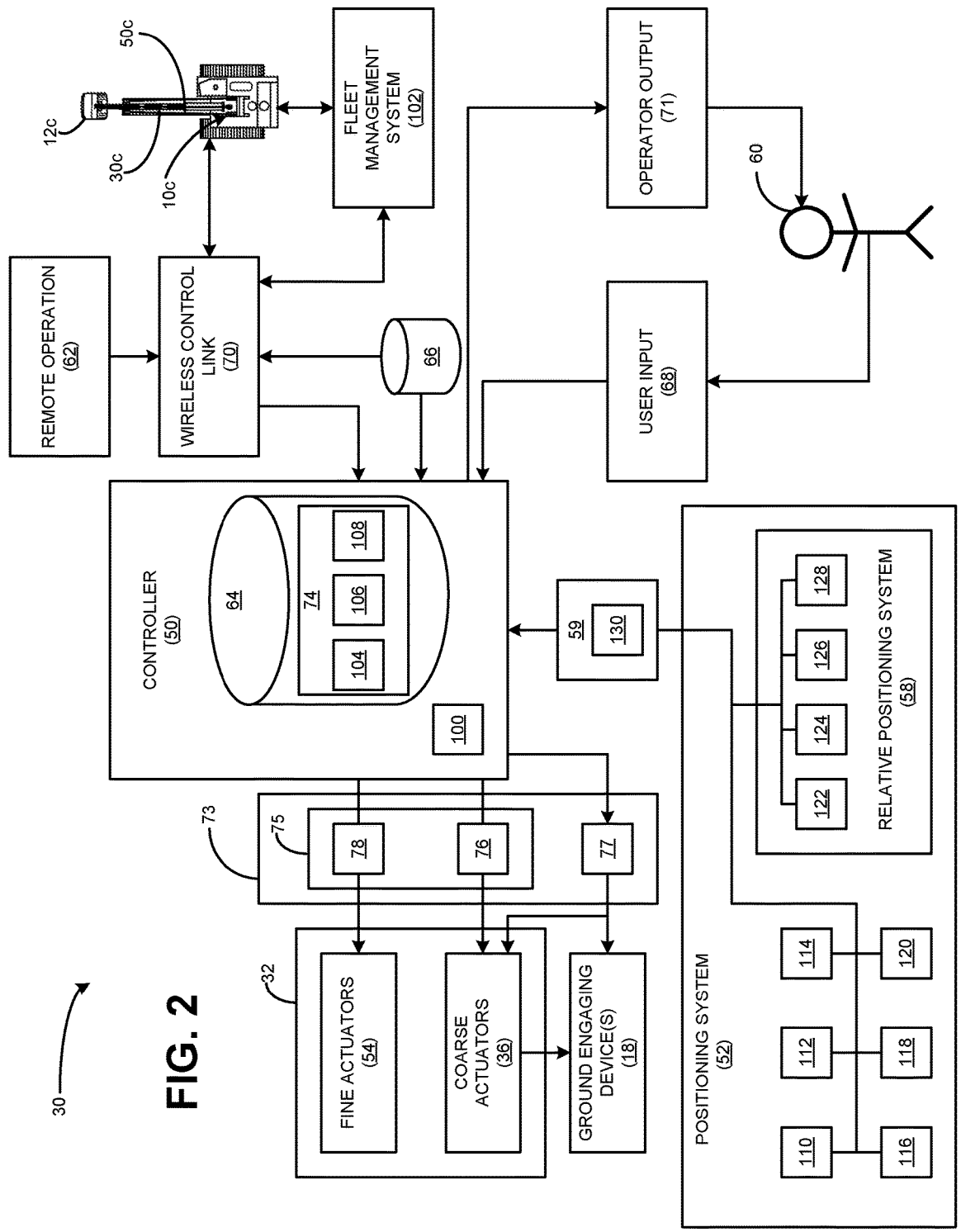
FIG. 2 is a schematic representation of the system of FIG. 1, in accordance with the present disclosure and the embodiment of FIG. 1.

With reference to both FIGS. 1 and 2, the control system 30 may include one or more actuators 32, which, in some examples, may include a plurality of coarse control actuators 36 for positioning and/or otherwise moving the machine 10 and/or implement 12. The plurality of coarse control actuators 36 may include, but are not limited to including, hydraulic actuators, motors, or any other suitable device for receiving instructions to actuate a component of the machine 10, the implement 12, or any other component associated with the machine 10 which may affect motion of the machine 10 and/or implement 12. The plurality of coarse control actuators 36 may include one or more boom actuator(s) 37 for rotating, raising, lowering, and/or otherwise positioning the boom 24 relative to the housing 14 when said boom actuator(s) 37 are actuated. For controlling positioning of the stick 26 relative to the boom 24, the plurality of coarse control actuators 36 may include one or more stick actuator(s) 38, which may rotate, raise, lower, and/or otherwise position the stick upon actuation. The plurality of coarse control actuators 36 may further include implement actuator(s) 40 for controlling coarse positioning of the implement 12. Implement actuator(s) 40 may rotate, raise, lower, and/or otherwise position the implement 12 upon actuation.

To provide signals to the plurality of coarse control actuators 36 for actuation, the coarse control actuators 36 may include or be otherwise operatively associated with a controller 50. The controller 50 is operatively associated with the one or more actuators 32 and, in turn, the coarse control actuators 36. The controller 50 may further be used to control fine actuators 54.

The controller 50 may be used to control the implement 12 in a variety of autonomous, semi-autonomous, or manual modes. As used herein, an implement 12 of a machine 10 operating in an autonomous manner operates automatically based upon information received from various sensors without the need for human operator input. Further, control of an implement 12 of a machine 10 operating semi-autonomously may include input from an operator 60, either within the machine 10 or remotely, who performs some tasks or provides some input while other tasks are performed automatically based upon information received from various sensors. An implement 12 of a machine 10 being operated manually is one in which an operator 60 is controlling all or essentially all of the direction, speed and manipulating functions of the implement 12 of the machine 10. An implement 12 of a machine 10 may be operated remotely by an operator (e.g., a remote operation 62) in either a manual or semi-autonomous manner.

Operation of the implement 12, preparation of the worksite 13 for additive construction, and/or additive construction operations, as performed in any of the above referenced control manners, may be executed by the controller 50. The controller 50 may be any electronic controller or computing system including a processor 100 which operates to perform operations, execute control algorithms, store data, retrieve data, gather data, and/or any other computing or controlling task desired. The controller 50 may be a single controller or may include more than one controller disposed to control various functions and/or features of the implement 12 and the machine 10. Functionality of the controller 50 may be implemented in hardware and/or software and may rely on one or more data maps relating to the operation of the machine 10 and the implement 12. To that end, the controller 50 may include internal memory 64 and/or the controller 50 may be otherwise connected to external memory 66, such as a database or server. The internal memory 64 and/or external memory 66 may include, but are not limited to including, one or more of read only memory (ROM), random access memory (RAM), a portable memory, and the like. Such memory media are examples of nontransitory memory media.

The internal memory 64 may store an additive construction plan 74 associated with additive construction operations to be performed on the worksite 13. To that end, storage of the additive construction plan 74 may occur based on pre-installation of the additive construction plan on the internal memory 64. In some additional or alternative examples, storage of the additive construction plan may be based on or occur due to receipt of the additive construction plan 74, by the internal memory 64, from another source, such as, but not limited to, the external memory 66, the remote operation 62, a user input 68, a fleet management system 102, or any other outside source. The controller 50 and, in turn, the memory 64 may, in some examples, receive the additive construction plan 74, at least in part, from said sources via a wireless control link 70. Further still, in some examples, the additive construction plan 74 may be altered or configured further based on stored programs and/or algorithms on the memory 64 and/or be altered or configured by internal logic of the processor 100 or any other computing elements of the controller 50.

The user input 68 may be included with the control system 30 so that the operator 60 may have the ability to operate/control the implement 12 of the machine 10 or otherwise provide input to the controller 50 and/or machine 10. For example, user input 68 may be provided within a cab 69 of the housing 14 of the machine 10, wherein the operator 60 may provide commands for the implement 12 when the machine 10 is operating in either a manual or semi-autonomous manner. The user input 68 may include one or more input devices through which the operator 60 may issue commands to control the implement 12 of the machine 10 by employing one or both of the coarse control actuators 32 and the fine actuators 34 of the control system 30.

In some examples, the system 30 may further include an operator output 71, which is operatively associated with the controller and may provide output from the controller to the operator 60. The operator output 71 may be configured to receive instructions from the controller 50 (e.g., instructions for manual or semi-autonomous control of the machine 10, for the operator 60) and present said instructions to the operator 60. The operator output 71 may include, for example, a visual display configured to present operation instructions to the operator 60.

The control system 30 may include the wireless control link 70 which is connected to a wireless network. Via the wireless control link 70, commands may be given to the implement 12 via the controller 50 from a remote operation 62 (e.g., a command center, a foreman's station, and the like). Further, information may be accessed from and/or stored to the external memory 66 using the wireless control link 70. In certain embodiments, control of the implement 12 via the control system 30 may be distributed such that certain functions are performed at the machine 10 level (e.g., by the operator 60 utilizing the user input 68) and other functions are performed via remote operation 62. Additionally, the machine 10 and/or controller 50 may communicate with a fleet management system 102, via the wireless control link 70.

Further, the control system 25 may be configured to implement the additive construction plan 74. The additive construction plan 74 may be instructions stored on the internal memory 64 and executed by the controller 50. The additive construction plan 74 may be influenced by elements of the control system 30, such as any input or feedback from a positioning system 52, which may include a relative positioning system 58, the user input 68, the remote operation 62, or any other conditions or controls associated with the implement 12 or the machine 10. The additive construction plan 74 may include one or more passes for a given task associated with the implement 12.

The additive construction plan 74 may be used by the controller 50 to determine control signals 73, which may include implement control signals 75 for controlling the implement 12 and/or the machine 10, in accordance with the additive construction plan 74 and any other modifying factors, as discussed below. The implement control signals 75 may include one or both of coarse control signals 76 and fine control signals 78. The coarse control signals 76 may be transmitted from the controller 50 to one or more of the coarse control actuators 36. The coarse control actuators 36, upon receiving the coarse control signals 76, may be actuated to execute coarse movements of the implement 12 in accordance with the additive construction plan 74 and any other modifying factors thereof. Similarly, the fine control signals 78 may be transmitted from the controller 50 to one or more of the fine actuators 54. Upon receiving the fine control signals 78, the fine actuators 54 may be actuated to perform fine movements of the implement 12 in accordance with the additive construction plan 74 and any other modifying factors thereof. "Fine movements" may be any movement of the implement 12 that has a range of motion that is less than the range of motion of the coarse movements.

In some examples, the additive construction plan 74 may include building-based or designing-based tool path instructions 104, which are based on a digital model (e.g., a computer-aided drafting (CAD) model, a 3-D rendering, or any other digital model). Such path planning information and/or executable files, which may embody the toolpath instructions 104, are commonly known and used in various forms of additive construction and/or three-dimensional printing, wherein an object is formed by a machine based on a digital file, which provides a basis for control instructions to a machine or implement. For example, the additive construction plan 74 may execute instructions for additive construction using the machine 10 and the implement 12. Additive construction or manufacturing, also often referred to as three-dimensional printing, is a process of creating three-dimensional structures from a digital plan or design file. Such additive manufacturing plans and/or designs can be transformed into cross-sections and used to form successive layers to be laid by an additive manufacturing device. Any digital file that provides implement control instructions for path planning may be used as or as part of the additive construction plan 74 and/or toolpath instructions 104, such as, but not limited to, a stereolithography (.stl) file format file, a Virtual Reality Modeling Language (VRML) format file, among other format files.

The additive construction plan 74 may include such digital plans and/or design files. In such examples, the implement 12 may be an additive construction device (e.g., an extruder) for laying down successive layers of material to construct a structure 79. In such an additive construction plan 74, instructions may include the toolpath instructions 104 for the implement 12 that are generated based on a digital, three-dimensional model. The toolpath instructions 104 may include successive layers of material to be laid until construction of the structure 79, to be manufactured, is completed. In such applications, precise control of the implement 12, using the control system 30, is required to properly and accurately lay the successive layers to construct the desired structure.

The toolpath instructions 104 may be configured for guiding the implement 12 to construct the structure 79. In some examples, the additive construction plan 74 may further include structure placement data 106, which is configured to provide the controller 50 and/or machine 10 with a desired location for constructing the structure 79. The structure placement data 106 may include general mapping data associated with the worksite 13, such that a general location can be configured; however, the structure placement data 106 may be useful in combination with positioning signals 59, provided by the positioning system 52 and discussed in greater depth below, to determine a construction zone on the worksite 13, upon which the structure 79 is to be build. Further still, in some examples, the additive construction plan 74 may include worksite parameters 108 for a structure zone, upon the worksite 13. The worksite parameters 108 may be any parameters for the surface, or structure zone, upon which the structure 79 is to be build. For example, the worksite parameters 108 may be topographical conditions that must be met prior to executing the toolpath instructions 104. Example conditions may include, but are not limited to including, elevation of a prospective structure zone, levelling of said surface of the structure zone, and the like.

In some examples, the control signals 73 may further include machine movement signals 77, which may be transmitted to actuators or other devices, such as the ground engaging device(s) 18, in order to propel or otherwise move the machine 10, about the worksite 13. Such instructions may be based on, but are not limited to being based on, the additive construction plan 74, user input 68, information from the positioning system 52, and any other information useful in determining machine movement signals 77.

Figure 3:
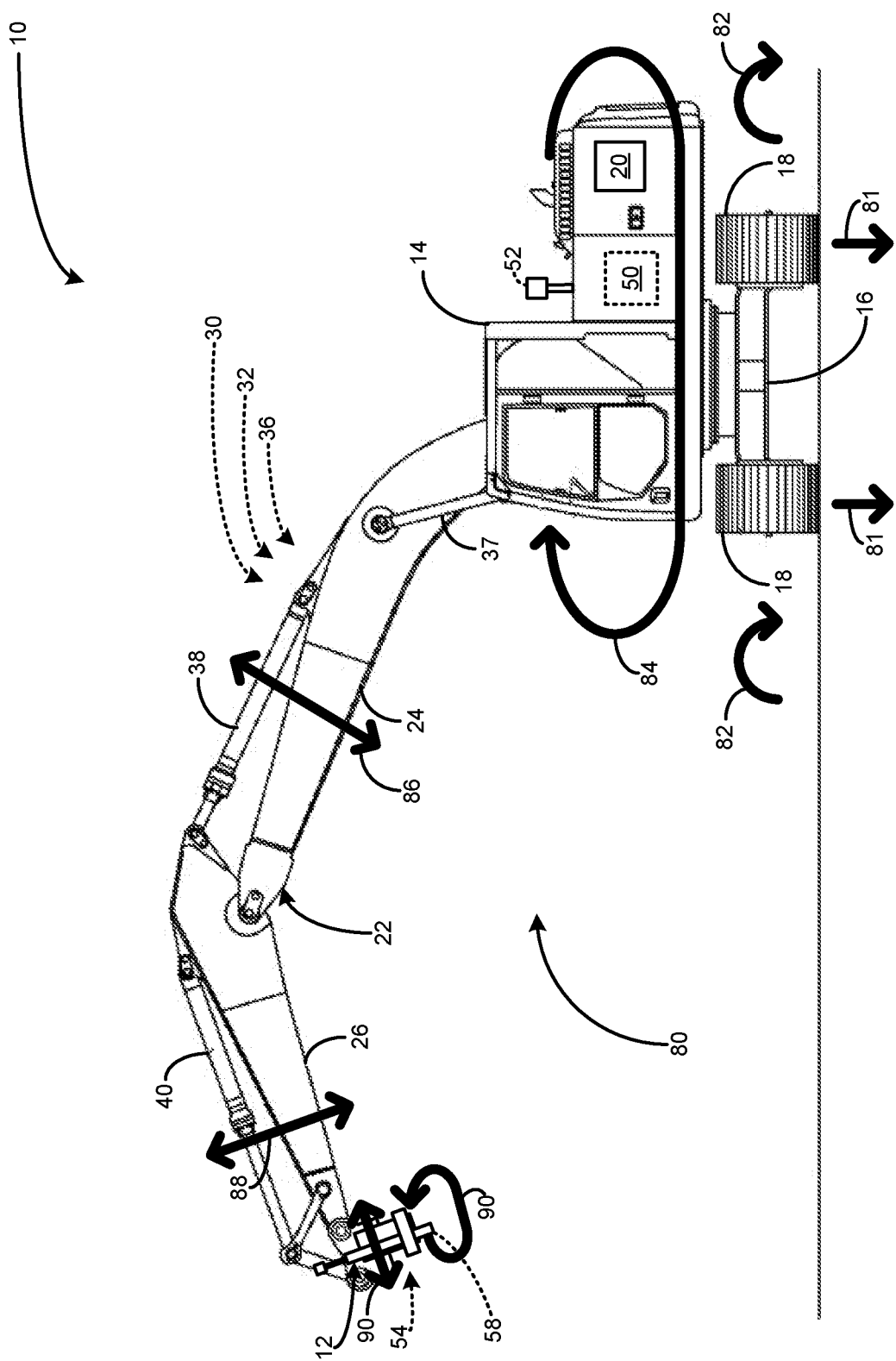
FIG. 3 is another side view of the example implement and machine of FIG. 1, but depicted showing functional characteristics of coarse control actuators associated with the control system depicted in FIGS. 1 and 2.

As mentioned above, the control system 30 includes the coarse control actuators 36, whose functions are further illustrated in FIG. 3 and described herein. In generating, implementing, optimizing, or otherwise affecting desired controls for the coarse control actuators 36, the controller 50 may receive and utilize information provided by the positioning system 52. In view of such desired controls, the coarse actuators 36 control coarse movement of the implement 12. For example, the coarse control actuators 36 may control movement of an implement in a range of motion that includes any motion plus or minus three inches along a desired path of movement instructed by the controller 50. However, this example is merely exemplary, and coarse movement controlled by the coarse control actuators 36 may be any range of motion which is greater than a range of motion of the fine actuators 54.

In the non-limiting example of such coarse control actuators 36 and the non-limiting example motion instructions 80 shown in FIG. 3, the coarse control actuators 36 may control the initial placement of the machine 10 by transmitting propulsion instructions to the ground engaging member(s) 18 and/or transmitting rotation instructions 82 for the ground engaging members to one or both of the ground engaging member(s) 18 and the undercarriage 16. Additional actuators (not shown) for positioning the ground engaging member(s) 18 and the undercarriage 16 may also be included. The coarse control actuators 36 may further provide control of the rotational position of the housing 14 via transmitting housing rotation instructions 84, which may be received by the housing 14, the undercarriage 16, and/or any other actuator or further movement device associated with the coarse control actuators 36. The housing rotation instructions 84 may set a gross position for the crane 22.

The crane 22 may be further controlled by boom height instructions 86 transmitted to boom actuator(s) 37. The boom height instructions 86 may raise or lower the boom 24 in accordance with the desired path of motion for the implement 12. The implement 12 may be further raised or lowered upon actuation of arm actuator(s) 38 based on arm height instructions, which may be transmitted to the arm actuator(s) 38 by the controller 50. Further, the implement 12 may be further raised, lowered, or otherwise positioned via coarse implement instructions 90, which may be transmitted to and executed by the implement actuator(s) 40.

Figure 4:
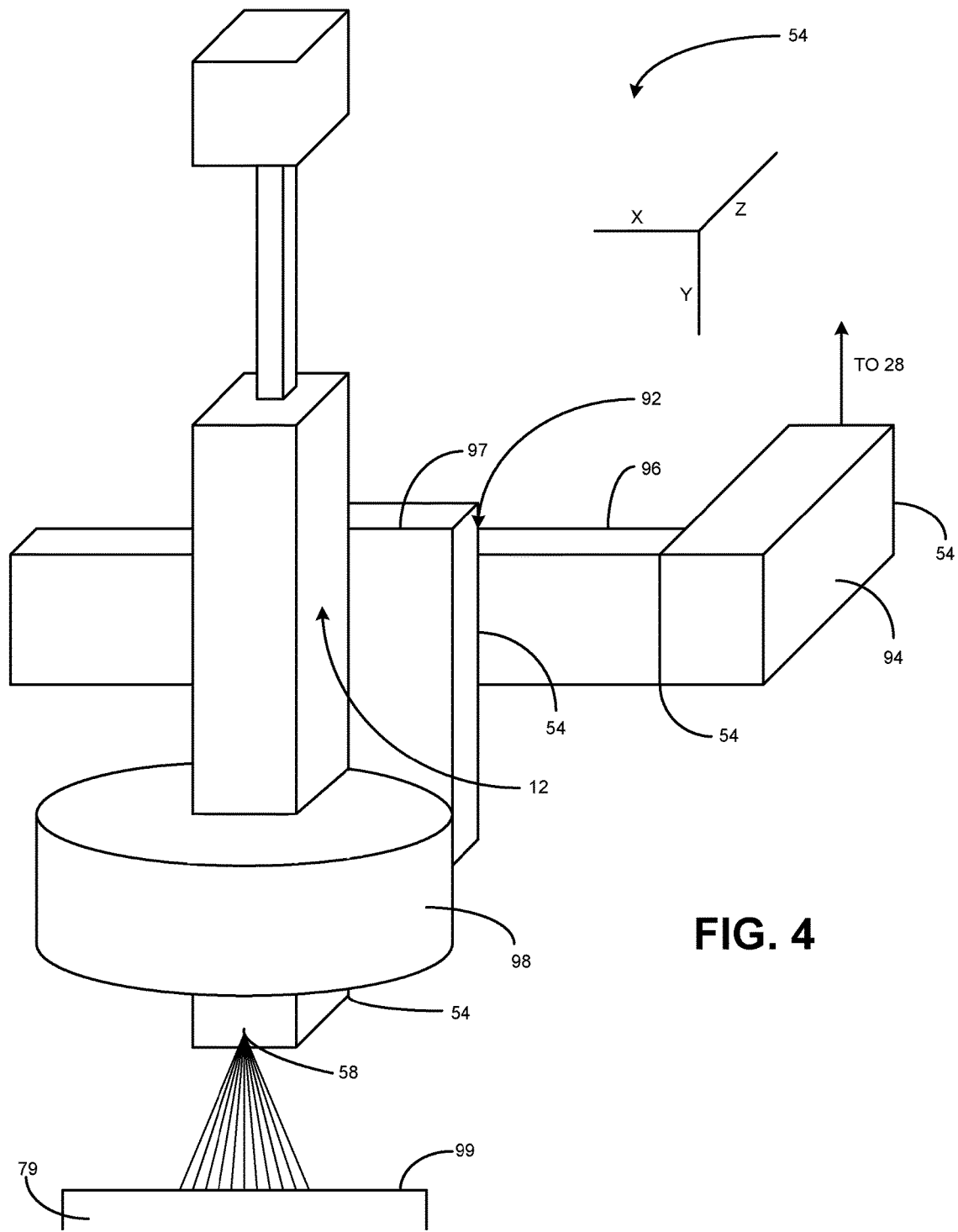
FIG. 4 is a three-dimensional perspective view of a fine control structure and fine actuators associated with the control system of FIG. 1 and depicted in a magnified fashion.

The implement 12 may be further positioned, moved, rotated, or otherwise controlled by the fine actuators 54. The fine actuators 54 may be used to execute fine movements necessary for positioning the implement 12. The "fine movements" executed by the fine actuators 54 may be any movement within any range of motion that is less than the range of motion of the coarse control actuators 36. For example, the fine actuators 54 may control movement of an implement 12 in a range of motion that includes any motion plus or minus two millimeters along a desired path of movement instructed by the controller 50. The fine actuators 54 are shown in a three-dimensional perspective view in FIG. 4. References to axes and planes, on which the depiction of the fine actuators 34 are disposed, are made in view of the depicted "X," "Y," and "Z" axes.

To control fine movement of the implement 12, the fine actuators 54 may include or be otherwise associated with a fine control structure 92, which may be positioned in response to actuation one or more of the fine actuators 54. The fine control structure 92 is operatively associated with the implement 12, but in some examples the fine control structure 92 may be considered a component of the implement 12 itself, while still controlled by the fine actuators 54. Alternatively, the fine control structure 92 may be a structure independent of the implement 12, wherein the implement is operatively associated with the fine control structure 92. The fine control structure 92 may further be attached, mounted to, or otherwise operatively associated with the stick 26 of the crane 22 at, for example, the distal end 28 of the stick 26. The fine actuators 54 may be located at and operatively connected to any location on the fine control structure 92 where the fine actuators 54 may be useful for positioning the implement 12. For example, and as shown, the fine actuators 54 may be located at connective points of positioning components of the fine control structure 92. Further, the fine actuators 54 may include, but are not limited to including, hydraulic actuators, motors, or any other suitable device for receiving instructions to position the implement 12 via, for example, the fine control structure 92.

The fine control structure 92 may be comprised of one or more associated components which pivot and/or otherwise move about any of the x, y, and/or z-axes to position the implement 12. Movement of elements of the fine control structure 92 may result from actuation of one or more of the fine actuators 54 in response to the fine control signals 78. In the non-limiting example of FIG. 4, the fine control structure 92 includes a first leg 94 that may connect to the distal end 28 of the stick 26 and shown extending along the z-axis, a second leg 96 that may pivotally connect to the first leg 94 and shown extending along the x-axis, a first mount 97 that may be connected to the second leg 96 and on which the implement 12 may be mounted, and a second mount 98 that may be connected to one or both of the implement 12 and the first mount 97 and may be able to rotate the implement 12. When actuated using one or more of the fine actuators 54, the first leg 94 may rotate, raise, lower, or otherwise move the implement 12 with respect to the positioning of the stick 26, as it may be connected to the distal end 28 of the stick 26. The second leg 96 may be pivotally connected to the first leg 94 and may rotate, raise, lower, or otherwise move the implement 12 with respect to the positioning of the first leg 94, when actuated by the fine actuators 54. The first mount 97 may be attached or otherwise operatively associated with the second leg 96 and may allow provide connection between the second leg 96 and the implement 12, such that it allows the implement 12 to move with the motion of the second leg 96, when moved by actuation of the fine actuators 54. In some examples, the first mount 97 may be movable with respect to the plane on which the second leg 96 is disposed. For example, the first mount 97 may be mounted to the second leg 96 via a track mount that allows the first mount 97 to move along the length of the second leg 96. Additionally, the second mount 98 may be used to further rotate the implement 12 along any plane on which the implement 12 is already positioned by upstream elements of the fine actuators 54.

Feedback for determining both coarse controls and fine controls for a control scheme (e.g., the additive construction plan 74) may be provided by the positioning system 52 and/or the relative positioning system 58, which, in some examples, may be considered part of or associated with the positioning system 52. The positioning system 52 may be employed to determine absolute positioning of the implement 12 and/or the machine 10 relative to a worksite. The positioning system 52 may include one or more GPS sensors 110 for detecting locations of the machine 10 or one or more elements of the machine 10 relative to the worksite. Other elements of the positioning systems 52 may include, but are not limited to including, perception based system sensors 112, and laser position detection systems 114, total station receivers 116, ranging radios 118, single or dual Global Navigation Satellite System (GNSS) receivers 120, and the like. All elements of the positioning system 52 may be used to determine the real time actual positioning of the implement 12 and/or the machine 10. Of course, other elements aiding in detecting positioning of implement 12 and/or the machine 10 or the worksite may be included and input from other sensors or receivers may also be used in determining the positioning of the implement 12 and/or the machine 10.

For relative position sensing, the relative positioning system 58 provides further feedback to the controller 50, which may be used for forming or influencing control instructions (e.g., the additive construction plan 74) and/or altering existing control instructions. The relative positioning system 58 may include one or more perception sensors for determining positioning relative to a past operation of the machine. For example, the relative positioning system 58 may include one or more cameras 122, LiDAR systems 124, one or more stereo cameras 126, one or more radar systems 128, or any other perception sensing device. LiDAR is a radar-like remote sensing technology that measures distance by illuminating a target with a laser and analyzing the reflected light (the term LiDAR is a portmanteau of "light" and "radar"). The relative positioning system 58 may generate images to be processed by the controller 50 and used to determine future positioning for the implement 12. In the example shown in FIG. 4, the relative positioning system may be used to detect an edge 99 of the structure 79. Further, use of the relative positioning system 58, and its associated perception sensors, may determine positioning signals 59 that include topographical characteristics of the worksite 13, which may be used, for example, to determine terrain or other topographical features of the worksite 13.

The ability of the relative positioning system 58 to determine relative position of the implement for use in future position may be useful when the additive construction plan 74 requires multiple passes to perform a task. Returning to the aforementioned, non-limiting example, where the implement 12 is an additive construction device, the controller 50 may determine where the implement 12 should be positioned, in accordance with the additive construction plan 74, when executing the next pass for adding a next layer to the structure 79. Feedback from the relative positioning system 58 may be utilized by the controller 50 to provide instructions to align the implement on top of the last pass, because the signals provided by the relative positioning system 58 from the previous pass can detect the edge 99 of the materials of the structure 79 laid in the previous pass.

Any input from any devices that comprise the positioning system 52 and/or the associated relative positioning system 58 may be utilized to determine, at least, a terrain or terrain information of the worksite 13. The positioning system 52 may include, amongst the elements described above or any additional elements, a plurality of individual sensors that cooperate to provide signals to the controller 50, to indicate the position of the machine 10 and/or topographical characteristics of a work surface, such as a terrain topography of the worksite 13. Using the positioning system 52, the controller 50 may determine the position of the machine 10 within the worksite 13, as well as determine positioning of the machine 10 relative to said terrain. With said information, a terrain, such as a real-time or static mapping of the worksite 13 and any objects or machines thereon, may be generated by the controller 50 based on information within the positioning signals 59 indicative of the terrain of the worksite 13 and any worksite objects existing thereon.

While the positioning system 52 and elements thereof, such as the relative positioning system 58, are depicted as on or operatively associated with the machine 10 and/or the implement 12, the positioning system 52 and elements thereof need not be attached to or otherwise operatively associated with the machine, so long as the positioning system 52 is capable of producing positioning signals 59 associated with the worksite 13, the machine 10, the implement 12, and/or any other objects present on the worksite 13. Accordingly, the positioning system 52 and/or certain elements thereof may exist detached from the machine 10, so long as they are capable of providing positioning signals 59 that include information indicative of a terrain of the worksite 13 and any objects existing thereon.

Accordingly, positioning signals 59, determined by the positioning system 52, may be utilized by the controller 50 for analyzing the worksite 13, prior to executing the toolpath instructions 104, and subsequently preparing the worksite 13 for the additive construction operations. The controller 50 may receive the positioning signals 59 from the positioning system 52, which include, at least, topographical characteristics 130 of the worksite 13 determined, for example, by perception sensors of the relative positioning system 58. In some examples the relative positioning system 58, via its associated perception sensors, may be configured to raster scan the worksite 13 to capture three-dimensional information associated with the worksite 13. Using such three-dimensional information, the relative positioning system 58 and/or the controller 50 may then determine a three-dimensional terrain map as part of the positioning signals, as part of the topographical characteristics 130. In some alternative examples, the relative positioning system 58 may be configured to utilize information from the toolpath instructions 104 to scan the worksite 13, relative to a potential base site for the structure 79. In such examples, the toolpath instructions 104 may include instructions for constructing a base of the structure and the relative positioning system 58 may be configured to scan, at least in part, the worksite 13 along the toolpath instructions for the base. By doing so, the controller 50 and/or the relative positioning system 58 may determine a three-dimensional terrain map, as part of the positioning signals 59, for the area of the worksite 13 upon which the base is intended to lie.

Figure 5:
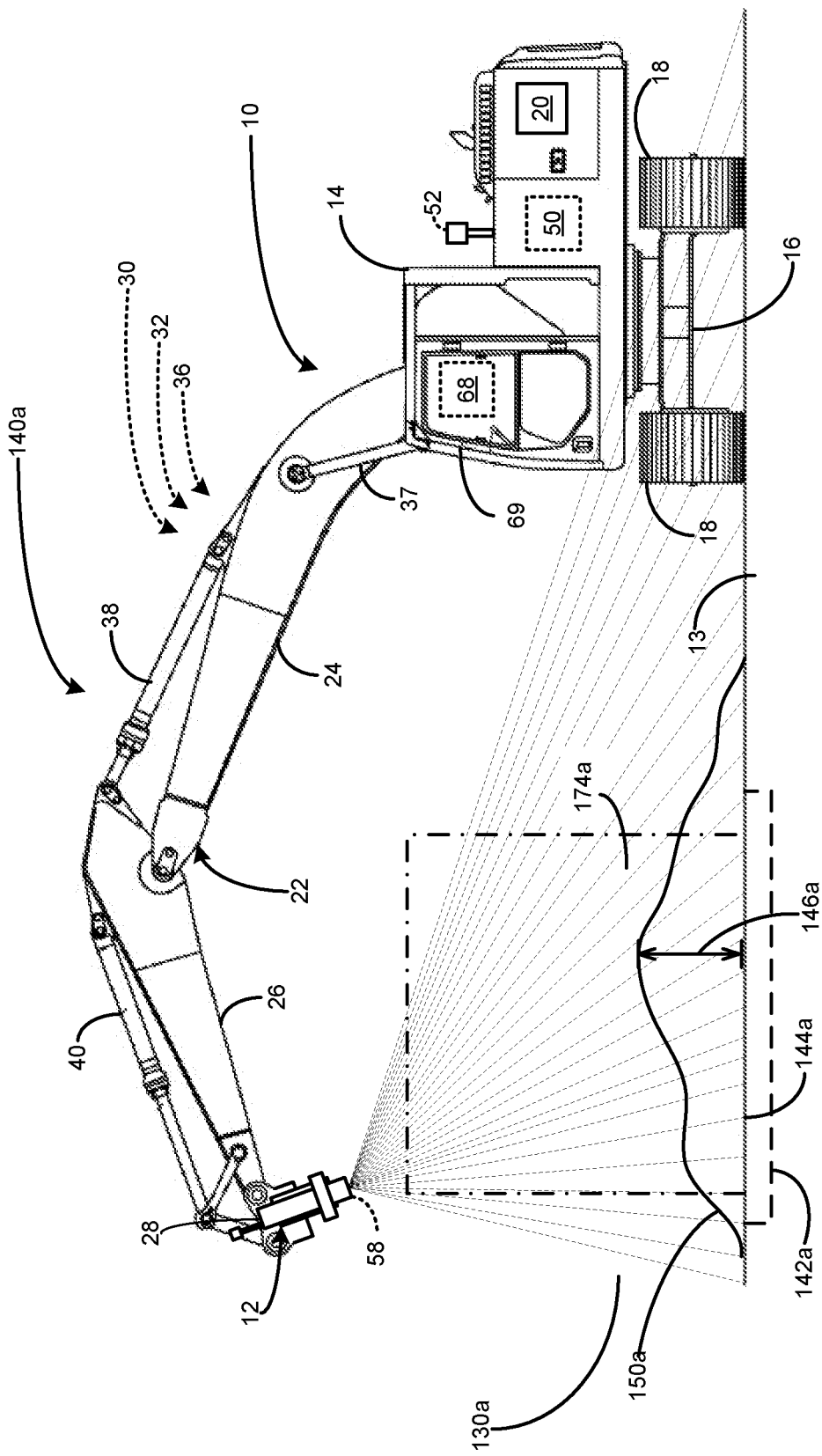
FIG. 5 is a side view of the machine, implement, and elements of the system of FIGS. 1-4, wherein at least one impediment to additive construction operations, on the worksite, is illustrated, in accordance with an embodiment of the disclosure.
Figure 6:
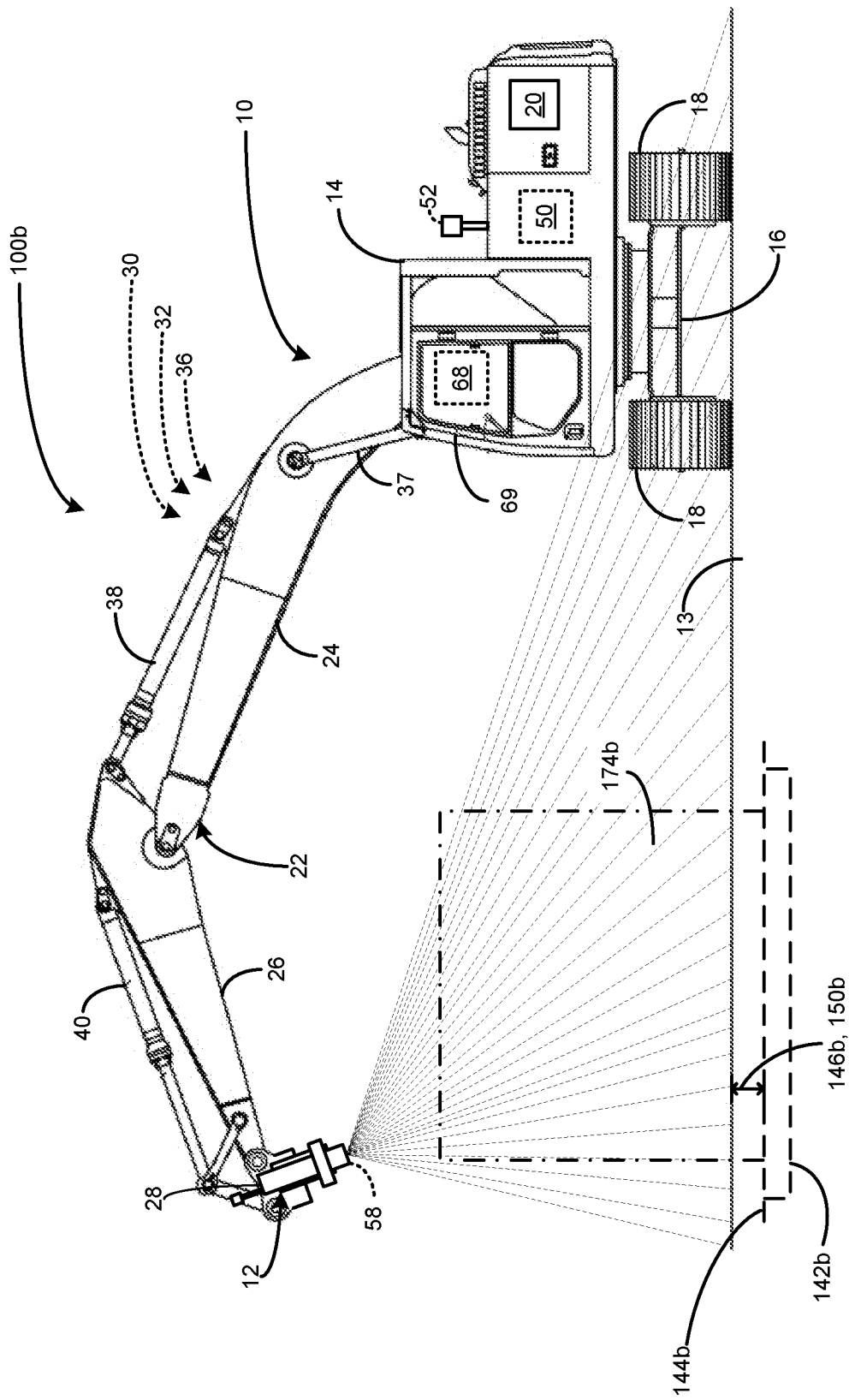
FIG. 6 is another side view of the machine, implement, and elements of the system of FIGS. 1-4, wherein at least one impediment to additive construction operations, on the worksite, is illustrated, in accordance with an embodiment of the disclosure.
Figure 7:
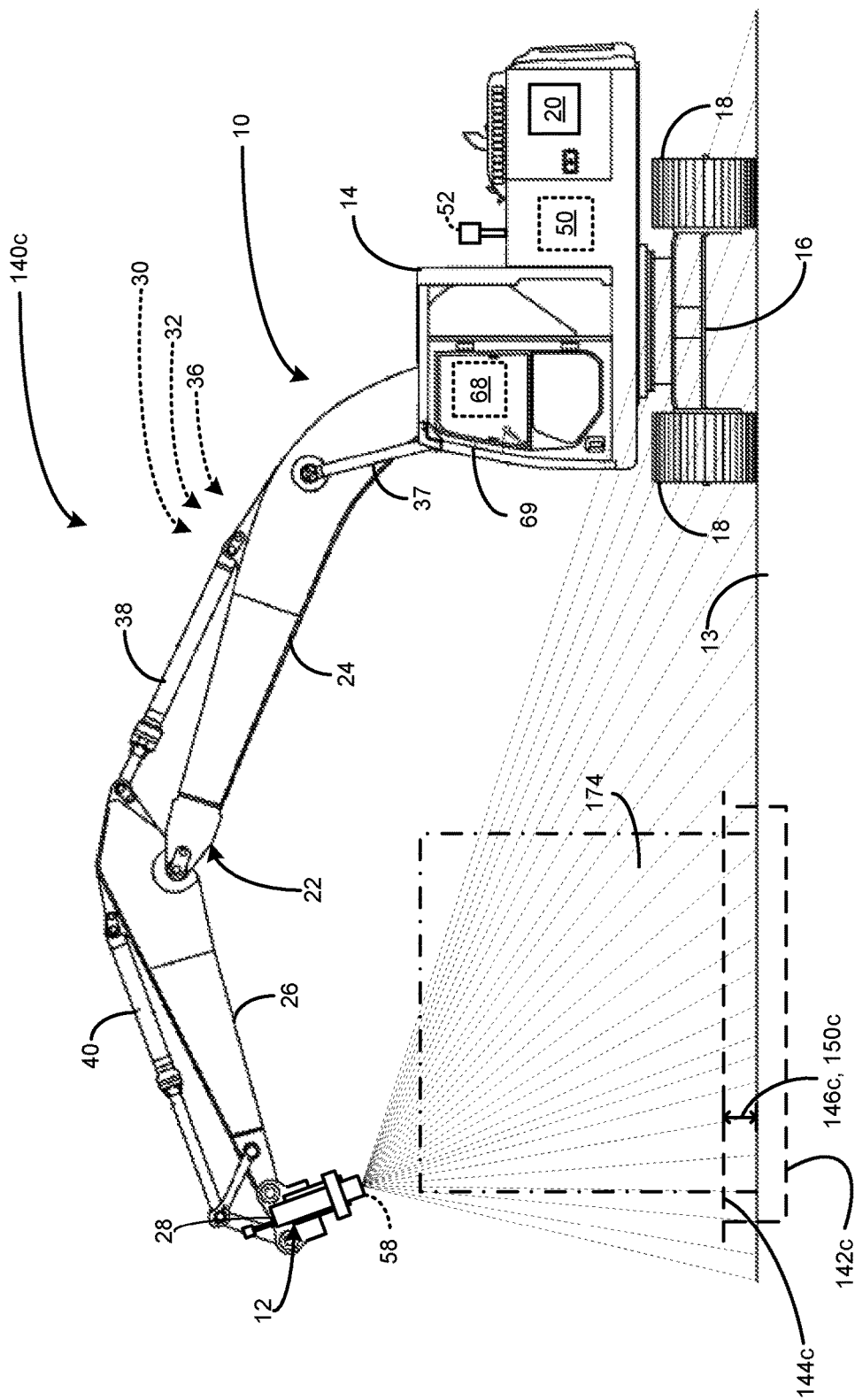
FIG. 7 is yet another side view of the machine, implement, and elements of the system of FIGS. 1-4, wherein at least one impediment to additive construction operations, on the worksite, is illustrated, in accordance with an embodiment of the disclosure.

Such topographical conditions, discussed above, are shown in the exemplary topographical scenarios 140 of FIGS. 5-7. As shown, the positioning system 52 may scan the worksite 13 at, at least, a structure zone 174. The structure zone 174 may be any space, volume, or area on the worksite 13 that is indicated for construction of the structure 79 by the structure placement data 106 and, in some examples, may be constrained by the worksite parameters 108. The controller 50 may utilize the structure placement data 106, such as the structure zone 174, and the additive construction plan 74, which may be accessed by the controller 50 from the memory 64, to determine a construction zone 142 on the worksite 13. The construction zone 142 may any space, volume, or area upon which construction of the structure 79 is intended, which is based, at least, on the structure placement data 106. The construction zone 142 may be based on, at least, the structure placement data (e.g., the structure zone 174 and the topographical characteristics 130 of the worksite 13. The construction zone 142 may be the actual space, volume, and/or area on the worksite 13 in which the machine 10 and implement 12 may perform the additive construction operations in accordance with the toolpath instructions 104.

After determining the construction zone 142, in which it is desired to construct the structure based, for example, on the structure zone 174, the controller 50 may further determine if the construction zone 142 is readied for execution of the toolpath instructions 104 at the construction zone 142. In some examples, such a determination of construction zone 142 readiness may include analyzing, by the controller 50, the topographical characteristics of the construction zone 142, based on or derived from the topographical characteristics 130, and determining if said topographical characteristics of the construction zone 142 meet the worksite parameters 108 of the additive construction plan 74.

In some examples, the worksite parameters 108 may include a base elevation 144 for the worksite 13, at the structure zone 174. The base elevation 144 may be any constant or varied elevation or series of elevations, at any area, space, or volume comprising the structure zone 174, upon which it is proper, in accordance with the additive construction plan 74, to construct the structure 79 thereupon. For example, the base elevation 144 may include maximum or minimum values for elevation upon certain surfaces of the structure zone 174 and, in turn, the chosen construction zone 142, that are suitable for performing the toolpath instructions 104, at said construction zone 142. In some non-limiting examples, such as those shown in FIGS. 5-7, the base elevation 144 is shown as substantially level or flat; however, the base elevation 144 need not be substantially level and can have any number of areas of different elevations or elevation variances. "Base elevation," as defined herein, generally refers to an elevation profile prescribed by the worksite parameters 108, for ensuring an acceptable site for construction of the structure 79.

Further, in such examples, the process of determining if the construction zone 142 is readied for execution of the toolpath instructions 104, by the controller 50 may rely on the base elevation 144 of the worksite parameters 108. In such examples, the controller 50 may determine a construction elevation 146 for the construction zone 142. The construction elevation 146 may be an actual elevation of the worksite 13 and any materials thereon, over any portion of the area, space, or volume of the construction zone 142. The construction elevation 146 need not be substantially level and can have any number of areas of different elevations or elevation variances. While shown, generally, as a height in FIGS. 5-7, the construction elevation 146 need not encompass just one height measurement over the construction zone 142; rather, the construction elevation 146 may encompass an elevation profile of any point within the construction zone 142, whether said elevation profile be varying (e.g., construction elevation 146a of FIG. 5) or substantially consistent (e.g., construction elevation 146b of FIG. 6 and construction elevation 146c of FIG. 7). The construction elevation 146 may then be compared with the base elevation 144a for the worksite 13, of the worksite parameters 108.

Based on the comparison, the controller 50 may then indicate whether or not the construction zone 142 is readied for execution of the toolpath instructions 104. If the comparison reveals that the base elevation 144 and the construction elevation 146 are substantially similar, then the controller 50 may indicate that the toolpath instructions 104 may be executed to construct the structure 79 at the construction zone 142. However, if the construction elevation 146 is not substantially similar to the base elevation 144, then the controller 50 may indicate that the construction zone is not ready for execution of the toolpath instructions 104.

If the controller 50 determines that the construction zone 142 is not readied for execution of the toolpath instructions 104, then the controller 50 may identify one or more impediments 150 to construction at the worksite 13, within the construction zone 142, based on the topographical characteristics 130 of the worksite 13. The impediments 150 may be any unacceptable space, area, or volume within the worksite 13 that is either not ideal for performing the toolpath instructions 104 or simply does not conform to conditions of the worksite parameters 108 set forth by the additive construction plan. Examples of impediments 150 are illustrated in FIGS. 5-7 and discussed in greater detail below, while example techniques, executed by the system 30, for preparing the construction zone(s) 142 for construction, by rectifying said impediments 150, are also discussed below.

The example of FIG. 5 shows a first scenario 140a, in which the impediment 150 shown is an obstructive mass 150a present at the desired structure zone 174a and, therefore, present at the construction zone 142a. The obstructive mass 150a may be any mass that rises above the base elevation 144a. The obstructive mass 150a may have any constant or varying elevation at any point within the surface area of the obstructive mass 150a; as with other described elevations, above, the elevation may be an elevation profile about the entire volume, space, or area that the obstructive mass 150a occupies. In such examples, identifying the impediments 150 to construction at the construction zone 142a, by the controller 50, includes identifying the obstructive mass 150a, as an impediment 150, if the comparison of the construction elevation 146a, corresponding with the obstructive mass 150a, and the base elevation 144a indicates that a mass having a maximum height (e.g., the base elevation shown, at the specific point, of 146a) greater than the base elevation exists in the construction zone 142a. Of course, the determination of said elevations may all be determined based on the topographical characteristics 130 determined by the positioning system 52.

Figure 8:
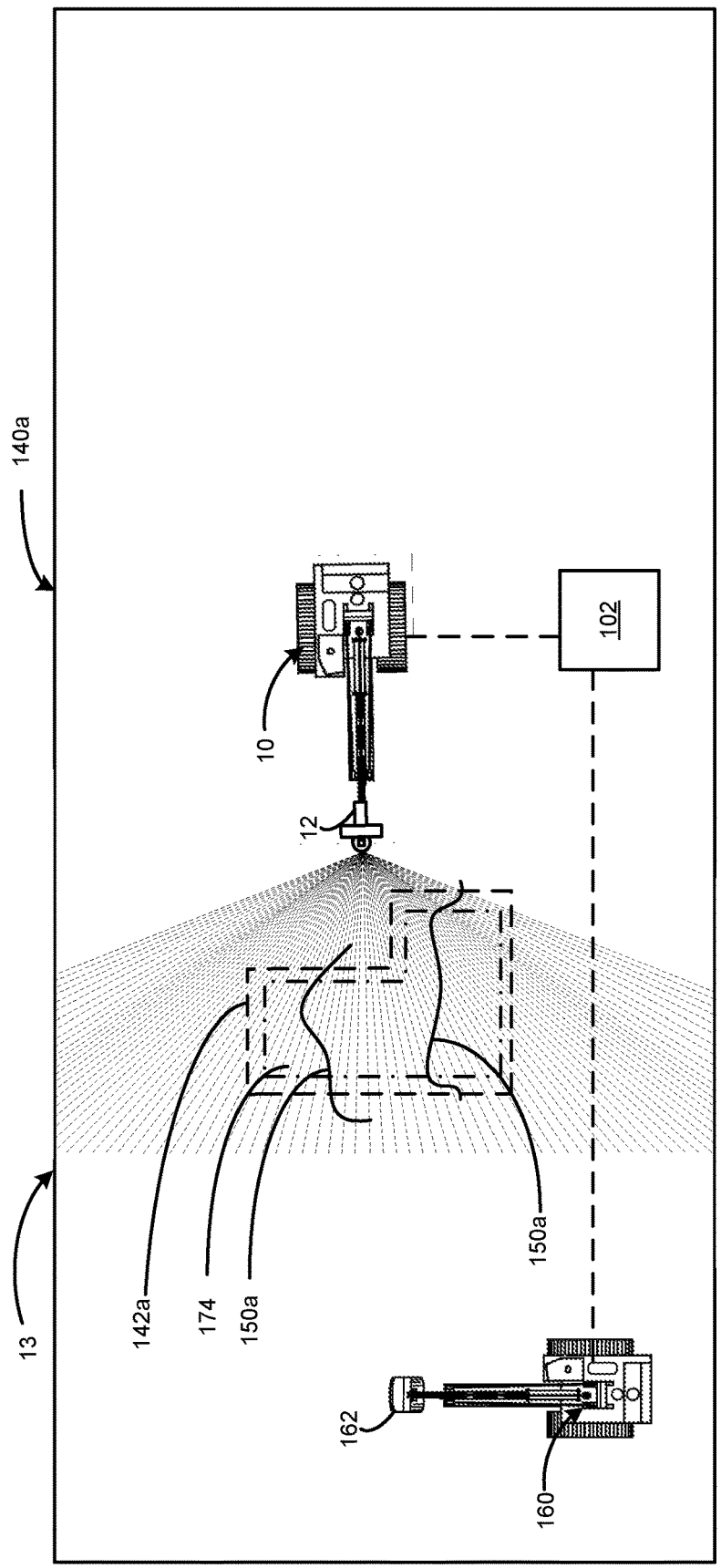
FIG. 8 is a top view of the worksite of FIG. 5, illustrating both the impediment to additive construction and an earth-moving machine that also operates on the worksite, in accordance with FIG. 5 and an embodiment of the disclosure.
Figure 9:
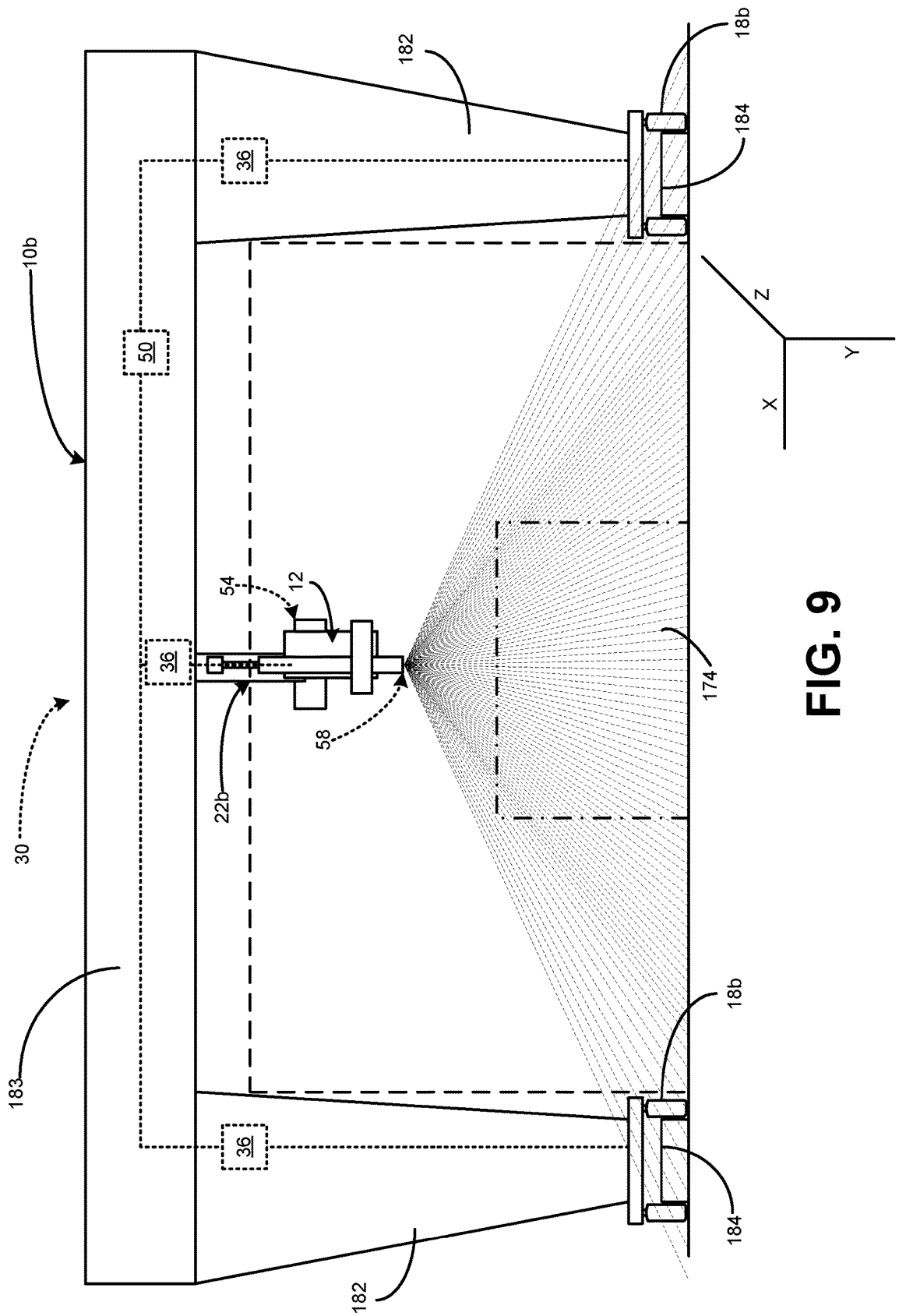
FIG. 9 is a side view of another example machine, with which the implements and control systems illustrated and described, with reference to FIGS. 1-8, may also be utilized, in accordance with an embodiment of the present disclosure.
Figure 10:
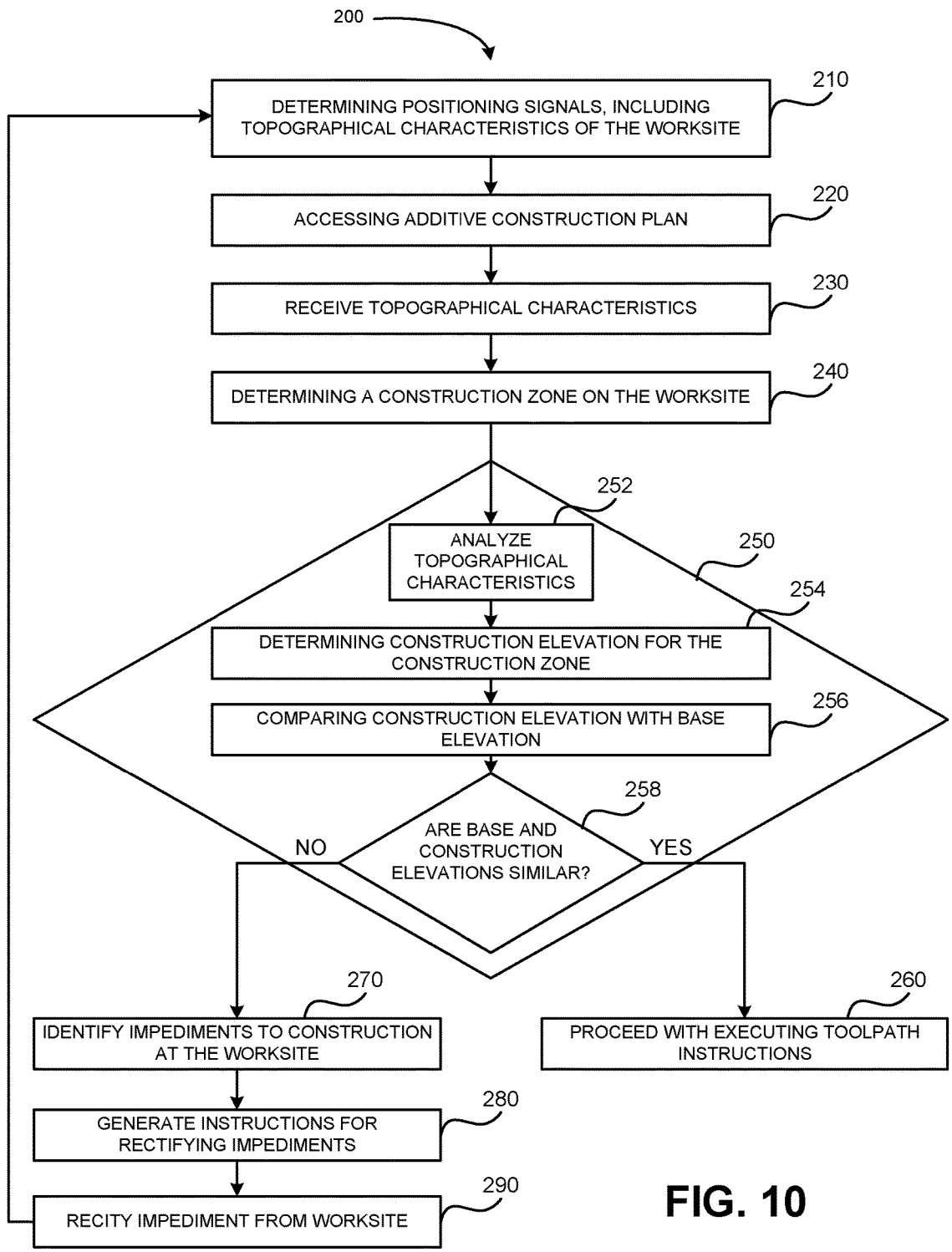
FIG. 10 is a flow chart representative of a method for preparing a worksite for additive construction operations, in accordance with the present disclosure.

In such examples, if the obstructive mass 150a exists, the controller 50 may further aim to rectify the impediment 150 caused by the obstructive mass 150a. The controller 50, therefore, may be configured to generate instructions for removing the obstructive mass 150a, if it is determined that the obstructive mass 150a exists in the construction zone 142a. In some further examples utilizing the system 30 as a system for performing additive construction operations, the controller may further be configured to include or utilize an earthmoving machine 160, having, at least, an earthmoving implement 162, which is present at the worksite 13, as best shown in the top view of the worksite 13, during the scenario 140a, of FIG. 8. While shown, generally, as an excavator-type machine having a bucket-type implement, the earthmoving machine 160 may be any earthmoving machine suitable for moving earth or other materials at the worksite 13, such as, but not limited to an excavator, a bulldozer, a motor grader, a hauling truck, and/or any other earthmoving machine known in the art. Further, the earthmoving implement 162 may be any implement capable of being utilized in conjunction with the earthmoving machine 160 to move earth or other materials at the worksite 13, such as, but not limited to, a bucket, a blade, a ripper, a drill, and/or any other suitable implement known in the art.

In such examples, the controller 50 may be further configured generate instructions for removing materials from the construction zone 142a to lower the construction elevation 146a, at least in part, to an approximated base elevation, which is substantially similar to the base elevation 144a, plus or minus any tolerances built into the worksite parameters 108. The controller 50 may then transmit said instructions to the earthmoving machine 160 and the earthmoving machine 160, being configured to move materials in accordance with the instructions for removing materials.

As discussed above, the system 30 may include the fleet management system 102, which may be utilized to communicate amongst machines on the worksite 13 (e.g., the machine 10 and the earthmoving machine 160). Therefore, the fleet management system 102 may be useful in communicating instructions from the controller 50 to the earthmoving machine 160. Accordingly, the controller 50 may be configured to determine and transmit information regarding one or more impediments 150, if the impediments 150 exist. The fleet management system 102 may be any communication system, base station, foreman's station, or any communication system or method capable of connecting and enabling communication amongst a plurality of machines and/or operators. Accordingly, the fleet management system 102 may receive information regarding the one or more impediments 150 to construction at the worksite 13, from the controller 50, at least one impediment 150 exists. Further, the fleet management system 102 may be configured to dispatch one or more of the machine 10, the earthmoving machine 160, and any combinations thereof, to rectify the impediments 150, if they exist.

Returning now to FIG. 6, a second scenario 140b is shown, in which the impediment 150 to construction, at the worksite 13, is a heightened elevation 150b at the worksite 13. A heightened elevation 150b may be any elevation greater than the base elevation 144b, as set forth by the worksite parameters 108. While the heightened elevation 150b is shown encompassing the entire worksite 13, as shown, it need not encompass the entire worksite 13, but may encompass the worksite 13, in part, so long as the heightened elevation 150b is heightened, relative to the base elevation 144b, at one or both of the construction zone 142b and the structure zone 174b. As shown, in this scenario 140b, the impediment 150 may be the construction elevation 146b, itself, as it is heightened with respect to the base elevation 144b. Therefore, the controller 50 may identify the impediment 150 of a heightened elevation 150b at the worksite 13 if the comparison of the construction elevation 146b and the base elevation 144b indicates that the construction elevation 146b is greater than the base elevation 144b.

In such examples, if the heightened elevation 150b exists, the controller 50 may further aim to rectify the impediment 150 caused by the heightened elevation 150b. The controller 50, therefore, may be configured to generate instructions for removing materials from the construction zone 142b to lower the heightened elevation 150b to an approximated base elevation, which is substantially similar to the base elevation 144b. In some further examples utilizing the system 30 as a system for performing additive construction operations, the controller may further be configured to include or utilize the earthmoving machine 160 to remove said materials. In such examples, the controller 50 may be further configured generate instructions for removing materials from the construction zone 142b to lower the construction elevation 146c, at least in part to an approximated base elevation, which is substantially similar to the base elevation 144b, within any tolerances set forth by the worksite parameters 108. The controller 50 may then transmit said instructions to the earthmoving machine 160 and the earthmoving machine 160, being configured to move materials in accordance with the instructions for removing materials.

In FIG. 7, a third scenario 140c is shown, in which the impediment 150 to construction, at the worksite 13, is a low elevation 150c at the worksite 13. A low elevation 150c may be any elevation lower than the base elevation 144c, as set forth by the worksite parameters 108. While the low elevation 150c is shown encompassing the entire worksite 13, as shown, it need not encompass the entire worksite 13, but may encompass the worksite 13, in part, so long as the low elevation 150c is lower, relative to the base elevation 144c, at one or both of the construction zone 142c and the structure zone 174c. As shown, in this scenario 140c, the impediment 150 may be the construction elevation 146c, itself, as it is lower, with respect to the base elevation 144c. Therefore, the controller 50 may identify the impediment 150 of a low elevation 150c at the worksite 13 if the comparison of the construction elevation 146c and the base elevation 144c indicates that the construction elevation 146c is greater than the base elevation 144c.

In such examples, if the low elevation 150c exists, the controller 50 may further aim to rectify the impediment 150 caused by the low elevation 150c. The controller 50, therefore, may be configured to generate instructions for depositing materials at the construction zone 142c to heighten the low elevation 150c to an approximated base elevation, which is substantially similar to the base elevation 144c, within given tolerances for the worksite parameters 108. In some further examples utilizing the system 30 as a system for performing additive construction operations, the controller may further be configured to include or utilize the earthmoving machine 160 to move materials to and deposit said materials at the construction zone 142c. In such examples, the controller 50 may be further configured generate instructions for depositing materials to the construction zone 142c to heighten the construction elevation 146c, at least in part to an approximated base elevation, which is substantially similar to the base elevation 144c. The controller 50 may then transmit said instructions to the earthmoving machine 160 and the earthmoving machine 160, being configured to move materials in accordance with the instructions for depositing materials.

INDUSTRIAL APPLICABILITY

The present disclosure generally relates to additive construction systems and methods and, more particularly, to systems and methods for preparing a worksite for additive construction operations. As shown above, the control system 30 may be employed for control of an excavator; however, the systems and methods of the present disclosure may be applied to any work machines performing additive construction. Further, such machines may include one or more implements to be controlled by the present disclosure's systems and methods, such implements may include, but are not limited to including, additive construction implements and similar tools for constructing structures based on control plans.

As mentioned, the system 30 for the implement 12, and any other control systems or methods disclosed herein, are not limited to use with the machine 10 shown in FIGS. 1-8, which are discussed above. For example, as shown in FIG. 12, the system 30 may be utilized to utilize and/or control an alternative machine 10b, for preparing a worksite for additive construction and/or performing additive construction operations, in accordance with the systems and methods disclosed herein. The machine 10b depicted in FIG. 12 is a gantry-type machine utilized to control the implement 12, when performing functions in accordance with an additive construction plan, such as the additive construction plan 74. The machine 10b may include two or more legs 182 positioned, generally, perpendicular with respect to the direction of gravity, which, as depicted, means the legs 182 extend in the "Y" coordinate direction along a Y axis. The legs 182 may each be attached to or operatively associated with ground engaging devices 18b, which may move the machine 10b with respect to the worksite and, in turn, position the implement 12 during or after motion of the machine 10b. In some examples, movement of the machine 10b, via the ground engaging devices 18b, may be constrained or guided by tracks 184, around which the ground engaging devices 18b are positioned and propel along. The ground engaging devices 18b, whether guided by the tracks 154 or not, may move the machine 10b and, in turn, the implement 12 along a Z-axis, as shown.

The machine 10b may further include a horizontal scaffold 103 positioned substantially perpendicular to the legs 182, which is also attached to or otherwise operatively connected to the legs 182, thereby moving with the legs 182 in response to propulsion from the ground engaging device(s) 18b. The horizontal scaffold 183 may be operatively associated with a gantry crane 22b, which may move the implement 12 along an X-axis, with respect to the horizontal scaffold 183. For example, the gantry crane 22b may be connected to the horizontal scaffold 183 via a track (not shown) and may be positioned upon the track, along the X-axis, with respect to the horizontal scaffold 183, by being positioned by one or more of the coarse actuators 36. Further, the gantry crane 22b may position the implement 12 along the Y axis via extension of the gantry crane 22b, retraction of the gantry crane 22b, or other positioning of the gantry crane 22b by another object or coarse actuator 36, relative to the horizontal scaffolding 103.

Accordingly, the control system 30 may control positioning of the implement 12, in accordance with the additive construction plan 74 by utilizing the machine 10b. In doing so, the control system 30 may utilize the coarse actuators 36 to perform coarse movements of the machine 10b, in positioning the implement 12, while, similar to the machine 10, also utilizing the fine actuators 54 to finely position the implement 12, in accordance with the additive construction plan 74.

In the examples wherein the implement 12 is an additive construction implement 12, the machine 10b may be utilized in conjunction with the control system 30, in accordance with the additive construction plan 74, to additively construct the structure 79, in accordance with the systems and methods disclosed herein. Furthermore, the systems and methods disclosed herein may further be utilized to prepare the worksite 13 for additive construction operations, utilizing the machine 10b.

Of course, while the machines 10, 10b are illustrated herein, it is certainly contemplated that the systems and methods of the present disclosure may be applied to other types of machines and, certainly, the systems and methods of the present disclose are not limited to application in conjunction with the machines 10, 10b.

By utilizing the systems and methods, herein, for preparing a worksite for additive construction operations, using any mentioned machines, the disclosed systems and methods may increase efficiency and/or cost effectiveness of additive construction operations, as discussed above. Furthermore, said systems and methods may achieve greater build quality of additive constructed structures by providing a more level and/or consistent base for constructing said structure. To that end, FIG. 13 illustrates a flowchart for an example method 200 for preparing a worksite for an additive construction operation. The method 200 is described, below, with reference to elements of the machine 10, the implement 12, and the system 30, as described in detail above with reference to FIGS. 1-9. However, the method 200 is certainly not limited to application in conjunction with the machine 10, the implement 12, and/or the associated system 30 and the method 200 is capable of being performed on or using other machines, implements, and systems.

The method 200 begins at block 210, wherein the positioning system 52, utilizing, at least, the perception sensors of the relative positioning system 58, determines the positioning signals 59, which include, at least, the topographical characteristics 130 of the worksite 13. The controller 50 may access the additive construction plan 74, as depicted in block 220, and receive the topographical characteristics 130 from the positioning system 52, as depicted in block 230. Utilizing structure placement data 106 of the additive construction plan 74 and the topographical characteristics 130, the controller may determine the construction zone 142, as depicted in block 240.

Utilizing, at least, the topographical characteristics 130 and the additive construction plan, the controller 50 may determine if the construction zone 142 on the worksite 13 is readied for execution of the toolpath instructions 104, at the construction zone 142, as depicted by the decision 250. The decision 250, as depicted, may include a plurality of sub-steps, represented by blocks 252, 254, 256 and decision 258; however, decision 250 is certainly not limited to being implemented utilizing blocks 252, 254, 256, and 258 and may be implemented using alternative methods for determining if the construction zone 142 is readied for execution of the toolpath instructions 104.

At block 252, the controller 50 may analyze the topographical characteristics 130 and determine if the topographical characteristics 130, at the construction zone 142, meet the worksite parameters 108. Accordingly, the controller 50 may determine the construction elevation 146 for the construction zone 142, as depicted in block 254, and compare the construction elevation 146 with the base elevation 144, for the worksite 13, of the worksite parameters 108, as depicted in block 256. If, as depicted at the decision 258, said comparison indicates that the base elevation 144 and the construction elevation 146 are substantially similar, than the machine 10, the implement 12, and/or the control system 30 may proceed with executing the toolpath instructions 104, at the construction zone 142, to construct the structure 79.

However, if, at the decision 258, said comparison indicates that the base elevation 144 and the construction elevation 146 are not substantially similar, then the method 200 may proceed to block 270, wherein the controller 50 may identify one or more impediments 150 to construction at the worksite 13, within the construction zone 142. As discussed above, such impediments 150 may include, but are not limited to including, existence of an obstructive mass 150a, a heightened elevation 150b at the worksite 13, and/or a low elevation 150c at the worksite 13. In such examples, the method 200 may continue to block 280, wherein the controller 50 may generate instructions for rectifying any impediments 150, determined to exist at the construction zone 142 by the controller 50. Further, said instructions may be utilized to rectify the impediment(s) 150 from the worksite by, for example, instructing the earthmoving machine 160 to deposit and/or remove materials from the construction zone 142, as depicted in block 190.

It will be appreciated that the present disclosure provides fine control systems for implements of machines. While only certain embodiments have been set forth, alternatives and modifications will be apparent from the above description to those skilled in the art. These and other alternatives are considered equivalents and within the spirit and scope of this disclosure and the appended claims.

What is claimed is:

1. A system for preparing a worksite for an additive construction operation, the additive construction operation performed by an implement associated with a machine, the system comprising:

a positioning system including one or more perception sensors, the positioning system configured to determine positioning signals, the positioning signals including topographical characteristics of the worksite;

a memory, the memory configured to store, at least, an additive construction plan, the additive construction plan for use in planning additive construction and controlling the implement during construction of a structure, the additive construction plan including, at least, structure placement data, configured for a desired location for constructing the structure, and toolpath instructions for guiding the implement to construct the structure; and a controller, including a processor, configured to:
receive, at least, the topographical characteristics of the positioning signals, from the positioning system,
access the additive construction plan, from the memory,
determine a construction zone on the worksite based on the structure placement data and the topographical characteristics of the worksite,
determine if the construction zone is readied for execution of the toolpath instructions at the construction zone, and
identifying one or more impediments to construction at the worksite, within the construction zone, based on the topographical characteristics of the worksite, if the construction zone is not readied for execution of the toolpath instructions at the construction zone.

2. The system of claim 1, wherein the additive construction plan includes worksite parameters for a structure zone, the worksite parameters being topographical conditions that must be substantially met prior to executing the toolpath instructions, and
wherein determining if the construction zone is readied for execution of the toolpath instructions, by the controller, includes analyzing the topographical characteristics of the construction zone and determining if the topographical characteristics of the construction zone meet the worksite parameters.

3. The system of claim 2, wherein the worksite parameters include a base elevation for the worksite, at the structure zone, and
wherein determining if the construction zone is readied for execution of the toolpath instructions, by the controller, further includes:
determining a construction elevation for the construction zone,
comparing the construction elevation with the base elevation for the worksite, and
indicating that the construction zone is not ready for execution of the toolpath instructions if the construction elevation is not substantially similar to the base elevation.

4. The system of claim 3, wherein the one or more impediments to construction at the worksite includes, at least, an obstructive mass present at the structure zone, the obstructive masses being a mass rising above the base elevation, and
wherein identifying one or more impediments to construction at the construction zone, by the controller, includes identifying the obstructive mass if the comparison of the construction elevation and the base elevation for the worksite indicates that a mass, having a maximum height greater than the base elevation, exists in the construction zone.

5. The system of claim 4, wherein the controller is further configured to generate instructions for removing the obstructive mass from the construction zone, if the comparison of the construction elevation and the base elevation for the worksite indicates that a mass having a maximum height greater than the base elevation exists in the construction zone.

6. The system of claim 3, wherein the one or more impediments to construction at the worksite includes, at least, a heightened elevation at the worksite, the heightened elevation being an elevation greater than the base elevation for the worksite, and
wherein identifying one or more impediments to construction at the worksite, by the controller, includes identifying the heightened elevation at the worksite if the comparison of the construction elevation and the base elevation for the worksite indicates that the construction elevation is greater than the base elevation for the worksite.

7. The system of claim 6, wherein the controller is further configured to generate instructions for removing materials from the construction zone to lower the heightened elevation at the construction zone to an approximated base elevation, which is substantially similar to the base elevation, if the construction elevation is greater than the base elevation for the worksite.

8. The system of claim 3, wherein the one or more impediments to construction at the worksite includes, at least, a low elevation at the worksite, the low elevation being an elevation less than the base elevation for the worksite, and
wherein identifying one or more impediments to construction at the worksite, by the controller, includes identifying the low elevation at the worksite if the comparison of the construction elevation and the base elevation for the worksite indicates that the construction elevation is less than the base elevation for the worksite.

9. The system of claim 8, wherein the controller is further configured to generate instructions for depositing materials from the construction zone to raise the low elevation at the construction zone to an approximated base elevation, which is substantially similar to the base elevation, if the construction elevation is less than the base elevation for the worksite.

10. The system of claim 1, wherein the one or more perception sensors are configured to:
raster scan the worksite to capture three-dimensional information associated with the worksite, and
determine a three-dimensional terrain map, as part of the positioning signals.

11. The system of claim 1, wherein the toolpath instructions include, at least, toolpath instructions for a base of the structure, and
wherein the one or more perception sensors are configured:
to scan, at least in part, the worksite along the toolpath instructions for a base, and
determine a three-dimensional terrain map, as part of the positioning signals.

12. The system of claim 1, wherein the perception sensors include, at least, a LiDAR sensor.

13. A system for performing additive construction operations on a worksite, the additive construction operations associated with an additive construction plan for constructing a structure, the additive construction plan for controlling the implement during construction of the structure, the additive construction plan including, at least, structure placement data, configured for a desired location for constructing the structure, and toolpath instructions for guiding the implement to construct the structure, the system comprising:

an implement configured to additively construct the structure in accordance with the additive construction plan;

a machine operatively associated with the implement and including:

one or more control actuators operatively associated with the implement, each of the one or more actuators configured to position the implement, with respect to the machine; and a power source providing power to at least one of the one or more control actuators to perform functions of the machines a positioning system including one or more perception sensors, the positioning system configured to determine positioning signals, the positioning signals including topographical characteristics of the worksite; and a controller, including a processor, configured to:

receive, at least, the topographical characteristics of the positioning signals, from the positioning system, access the additive construction plan, determine a construction zone on the worksite based on structure placement data and the topographical characteristics of the worksite, determine if the construction zone is readied for execution of the toolpath instructions at the construction zone, identifying one or more impediments to construction at the worksite, within the construction zone, based on the topographical characteristics of the worksite, if the construction zone is not readied for execution of the toolpath instructions at the construction zone, and instruct the one or more control actuators of the machine to position the implement for performing the additive construction operations in accordance with the toolpath instructions, if the construction zone is readied for execution of the toolpath instructions at the construction zone.

14. The system of claim 13, wherein the additive construction plan includes worksite parameters for a structure zone, the worksite parameters being topographical conditions that must be substantially met prior to executing the toolpath instructions, the worksite parameters including, at least, a base elevation for the worksite, at the structure zone, and wherein determining if the construction zone is readied for execution of the toolpath instructions, by the controller, further includes:

determining a construction elevation for the construction zone, compare the construction elevation with the base elevation for the worksite, and indicate that the construction zone is not ready for execution of the toolpath instructions if the construction elevation is not substantially similar to the base elevation.

15. The system of claim 14, wherein the one or more impediments to construction at the worksite include one or more of an obstructive mass present at the structure zone, a heightened elevation at the structure zone, a low elevation at the structure zone, and any combinations thereof, wherein the obstructive mass is a mass rising above the base elevation, the heightened elevation is an elevation greater than the base elevation for the worksite, and the low elevation is an elevation less than the base elevation for the worksite, and wherein identifying one or more impediments to construction at the worksite, by the controller, includes analyzing the comparison of the construction elevation and the base elevation to determine a discrepancy in elevation, wherein the discrepancy in elevation will be that the construction elevation is greater than the base elevation when an obstructive mass or heightened elevation is present at the structure zone, and wherein the discrepancy in elevation will be that the construction elevation is less than the base elevation when a low elevation is present at the structure zone.

16. The system of claim 15, further comprising an earthmoving machine configured to move materials at the worksite, wherein the controller is further configured to:

generate instructions for depositing materials from the construction zone, if the one or more impediments to construction is a low elevation, to raise the low elevation at the construction zone to an approximated base elevation, which is substantially similar to the base elevation, if the construction elevation is less than the base elevation for the worksite, and transmit the instructions for depositing materials to the earthmoving machine, and wherein the earthmoving machine is configured to move materials in accordance with the instructions for depositing materials.

17. The system of claim 15, further comprising an earthmoving machine configured to move materials at the worksite, wherein the controller is further configured to:

generate instructions for removing materials from the construction zone, if the one or more impediments to construction includes one or more of the heightened elevation and the obstructive mass, to lower the elevation, at least in part, at the construction zone to an approximated base elevation, which is substantially similar to the base elevation, if the construction elevation is, at least in part, greater than the base elevation for the worksite, and transmit the instructions for depositing materials to the earthmoving machine, and wherein the earthmoving machine is configured to move materials in accordance with the instructions for removing materials.

18. The system of claim 13, further comprising a fleet management system configured to:

receive information regarding the one or more impediments to construction at the worksite from the controller, if one or more impediments to construction at the worksite exist, and dispatch one or more of the machine, an earthmoving machine, and any combinations thereof, to rectify the one or more impediments to construction at the worksite, if the one or more impediments to construction at the worksite exist, and wherein the controller is further configured to determine and transmit the information regarding the one or more impediments to construction at the worksite from the controller, if one or more impediments to construction at the worksite exist.

19. A method for preparing a worksite for an additive construction operation, the additive construction operation performed by an implement associated with a machine, the method comprising:

determining positioning signals, using a positioning system including one or more perception sensors, the positioning signals including, at least, topographical characteristics of the worksite;

accessing, by a controller, an additive construction plan, the additive construction plan for use in planning additive construction and controlling the additive construction implement during construction of a structure, the additive construction plan including, at least, structure placement data, configured for a desired location for constructing the structure, and toolpath instructions for guiding the implement to construct the structure;

receiving, by the controller, the topographical characteristics of the positioning signals, from the positioning system;

determining, by the controller, a construction zone on the worksite based on the structure placement data and the topographical characteristics of the worksite;

determining, by the controller, if the construction zone is readied for execution of the toolpath instructions at the construction zone; and identifying, by the controller, one or more impediments to construction at the worksite, within the construction zone, based on the topographical characteristics of the worksite, if the construction zone is not readied for execution of the toolpath instructions at the construction zone.

20. The method of claim 19, wherein the additive construction plan includes worksite parameters for a structure zone, the worksite parameters being topographical conditions that must be substantially met prior to executing the toolpath instructions, the worksite parameters including, at least, a base elevation for the worksite, at the structure zone, and wherein determining if the construction zone is readied for execution of the toolpath instructions, by the controller, includes:

analyzing the topographical characteristics of the construction zone and determining if the topographical characteristics of the construction zone meet the worksite parameters, determining a construction elevation for the construction zone, comparing the construction elevation with the base elevation for the worksite, and indicating that the construction zone is not ready for execution of the toolpath instructions if the construction elevation is not substantially similar to the base elevation.

* * * * *